(12) United States Patent
Hackemer

(10) Patent No.: US 8,605,371 B2
(45) Date of Patent: Dec. 10, 2013

(54) MINIATURE ZOOM LENS

(75) Inventor: Witold Hackemer, Einbeck-Vogelbeck (DE)

(73) Assignee: Qioptiq Photonics GmbH & Co. KG, Göttingen (DE)

( * ) Notice: Subject to any disclaimer, the term of this patent is extended or adjusted under 35 U.S.C. 154(b) by 0 days.

(21) Appl. No.: 13/158,159

(22) Filed: Jun. 10, 2011

(65) Prior Publication Data

US 2011/0299176 A1 Dec. 8, 2011

Related U.S. Application Data

(63) Continuation of application No. PCT/EP2009/008800, filed on Dec. 9, 2009.

(30) Foreign Application Priority Data

Dec. 12, 2008 (DE) .......................... 10 2008 061 664

(51) Int. Cl.
*G02B 9/34* (2006.01)

(52) U.S. Cl.
USPC .......................................................... 359/781

(58) Field of Classification Search
USPC .................................. 359/684, 781
See application file for complete search history.

(56) References Cited

U.S. PATENT DOCUMENTS

| | | | |
|---|---|---|---|
| 4,367,921 A | 1/1983 | Sawamua et al. | |
| 5,179,471 A | 1/1993 | Caskey et al. | |
| 6,924,939 B2 | 8/2005 | Itoh | |
| 7,312,931 B2 | 12/2007 | Sano et al. | |
| 7,315,422 B2 | 1/2008 | Masui et al. | |
| 2001/0013978 A1 | 8/2001 | Mihara | |
| 2003/0193722 A1 | 10/2003 | Mihara | |
| 2005/0105192 A1 | 5/2005 | Park | |
| 2006/0012886 A1 | 1/2006 | Kim | |
| 2007/0139787 A1 | 6/2007 | Kim | |
| 2008/0062531 A1 | 3/2008 | Kim et al. | |
| 2008/0204893 A1 | 8/2008 | Jeong et al. | |
| 2010/0265363 A1* | 10/2010 | Kim .......................... | 348/240.3 |
| 2011/0257671 A1 | 10/2011 | Trovato et al. | |

FOREIGN PATENT DOCUMENTS

| | | |
|---|---|---|
| DE | 2059814 | 7/1971 |
| DE | 204 320 A1 | 11/1983 |
| DE | 34 06 907 A1 | 10/1984 |
| DE | WO 92/15031 | 9/1992 |

(Continued)

OTHER PUBLICATIONS

U.S. Appl. No. 13/030,414, filed Feb. 2011, Ulrich et al.

(Continued)

*Primary Examiner* — Joseph P Martinez
(74) *Attorney, Agent, or Firm* — Shlesinger, Arkwright & Garvey LLP

(57) ABSTRACT

A Miniature zoom lens, in particular for use in mobile telephones, in which the zoom lens, as viewed from the object plane, has the following in the stated sequence: at least one negative first optical lens group, at least one negative second optical lens group, at least one positive third optical lens group, and at least one positive fourth optical lens group. The second, third, and fourth optical lens groups are configured in such a way that focusing is achieved solely by displacement of the fourth optical lens group, and during the focusing the positions of the second and third lens groups remain unchanged.

6 Claims, 14 Drawing Sheets

(56) References Cited

FOREIGN PATENT DOCUMENTS

| | | | |
|---|---|---|---|
| DE | 103 22 587 A1 | 1/2005 | |
| DE | 102007058158 A1 | 6/2008 | |
| EP | 1 901 104 A1 | 3/2008 | |
| JP | 60113203 A | 6/1985 | |
| JP | 61011701 A | 1/1986 | |
| JP | 2002010118 A | 1/2002 | |
| JP | 2006-301262 | * 11/2006 | ............. G02B 15/20 |
| JP | 2006 301262 A | 11/2006 | |
| WO | WO 2009/064076 A1 | 5/2009 | |

OTHER PUBLICATIONS

Irving BR: "Code V Test Drive" May 1, 1989, Code V Test Drive, Optical Research Associates, (pp. 1-29).

International Search Report (ISR) in application No. PCT/EP2009/008800, filed Dec. 9, 2009, ISR dated Feb. 24, 2010 (7 pgs.).

Written Opinion in application No. PCT/EP2009/008800, filed Dec. 9, 2009, Opinion dated Feb. 24, 2010 (10 pgs.).

U.S. Appl. No. 13/158,159, filed Jun. 2011, Hackemer.

German Wikipedia article "Strahlteiler" ["Beam Splitter"] dated Oct. 4, 2010, 1 page.

German Wikipedia article "Brechungsindex" ["Refraction Index"] dated Feb. 16, 2011, 9 pages.

DE Office Action for German application No. 10 2011 012 155.2, filed Feb. 23, 2011, dated Oct. 17, 2011, 5 pages.

PCT International Search Report of PCT/EP2009/005692, dated Nov. 11, 2009 (2 pgs.).

Nikon Spiegelreflexkamera [single lens reflex (SLR) camera] F6 Photokina 2004 Brochure, dated 2004 (16 pgs.).

* cited by examiner

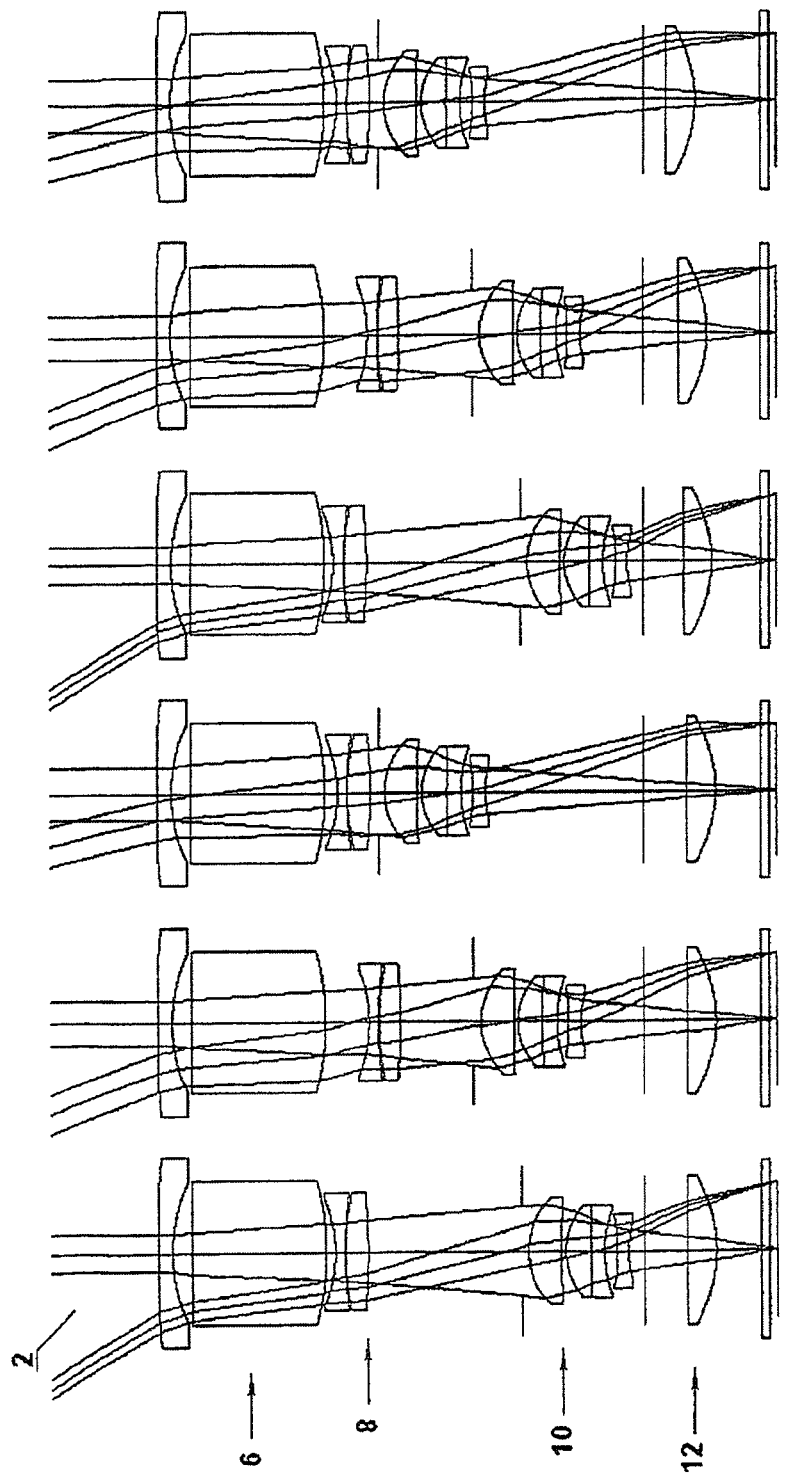

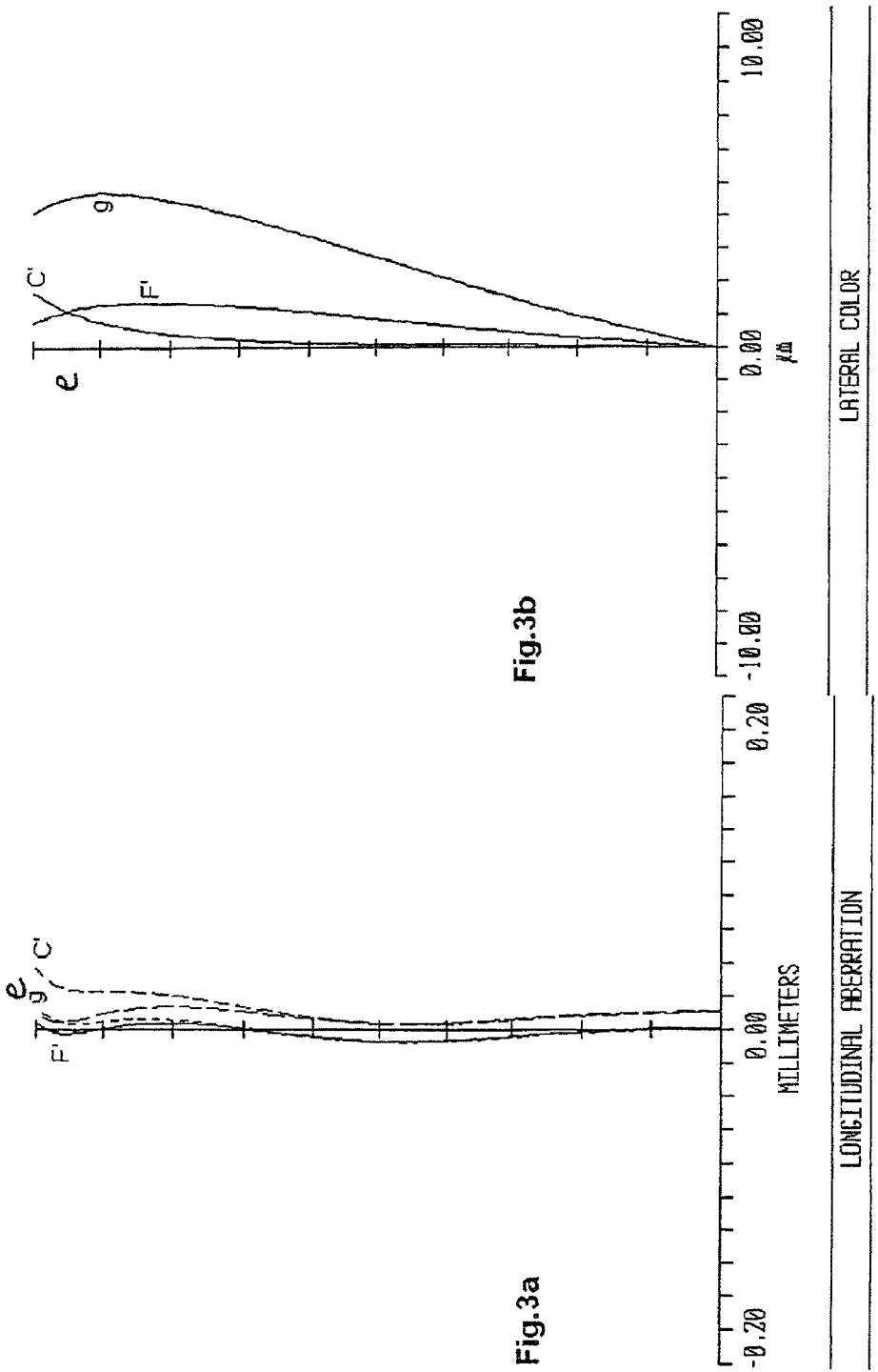

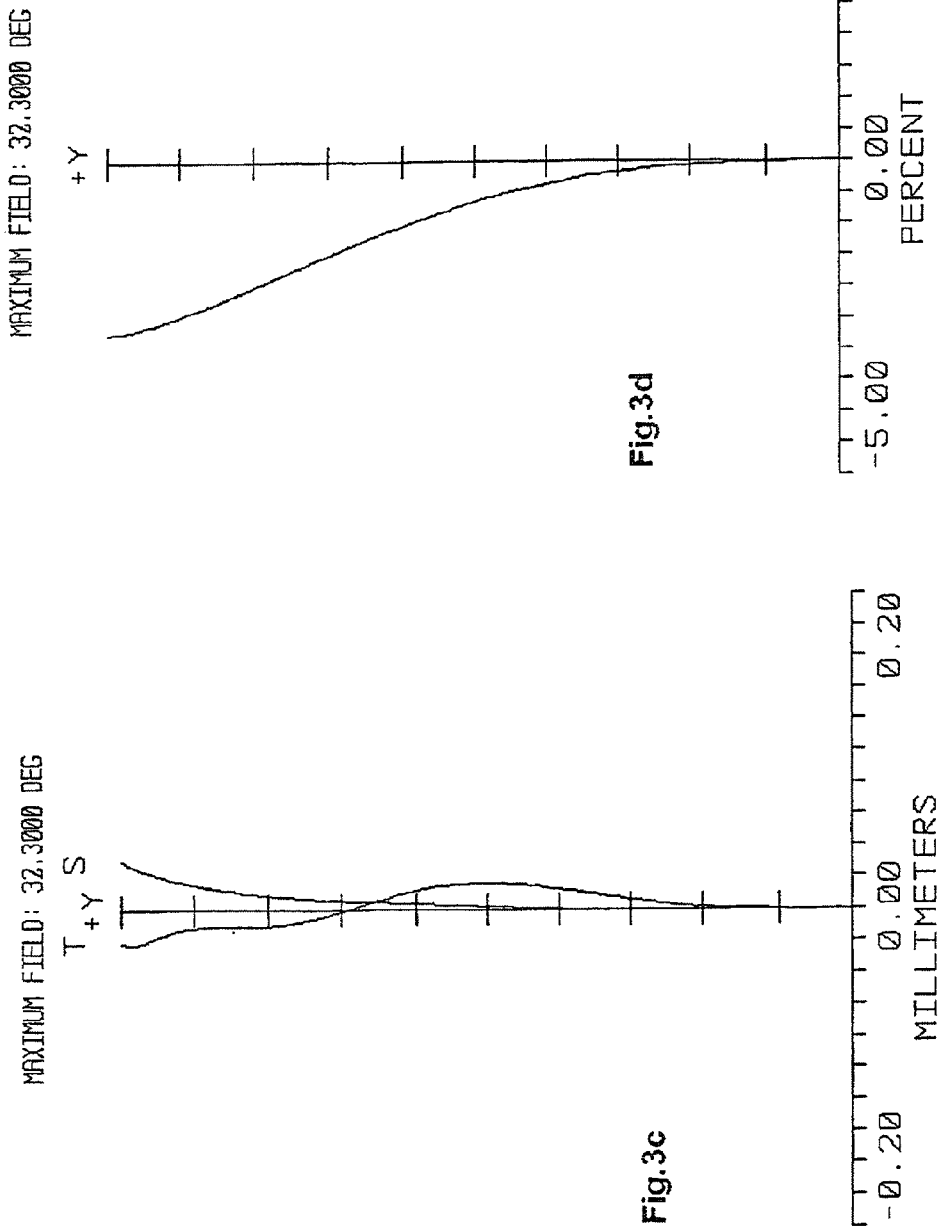

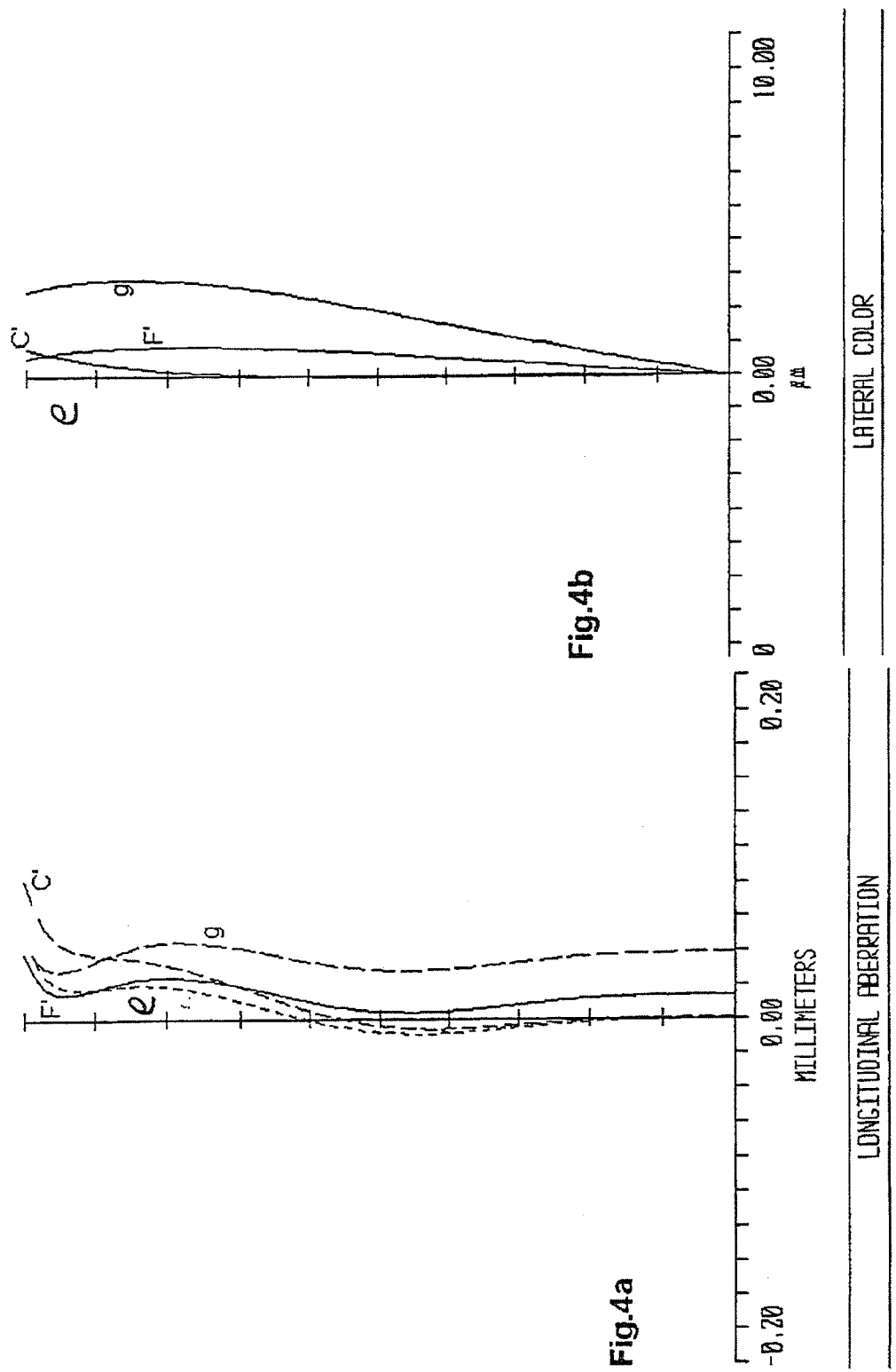

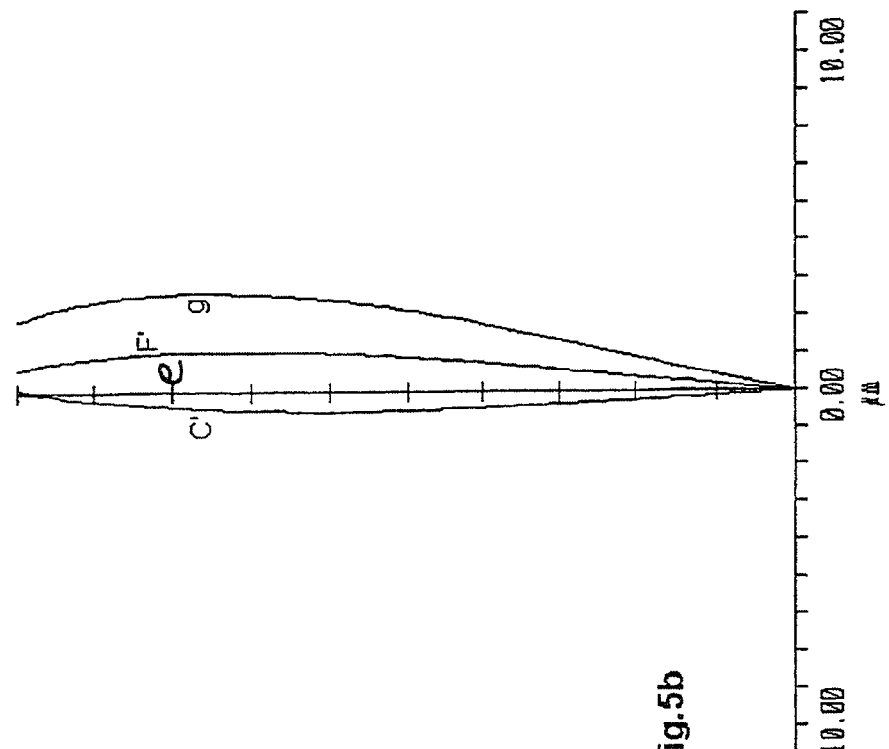

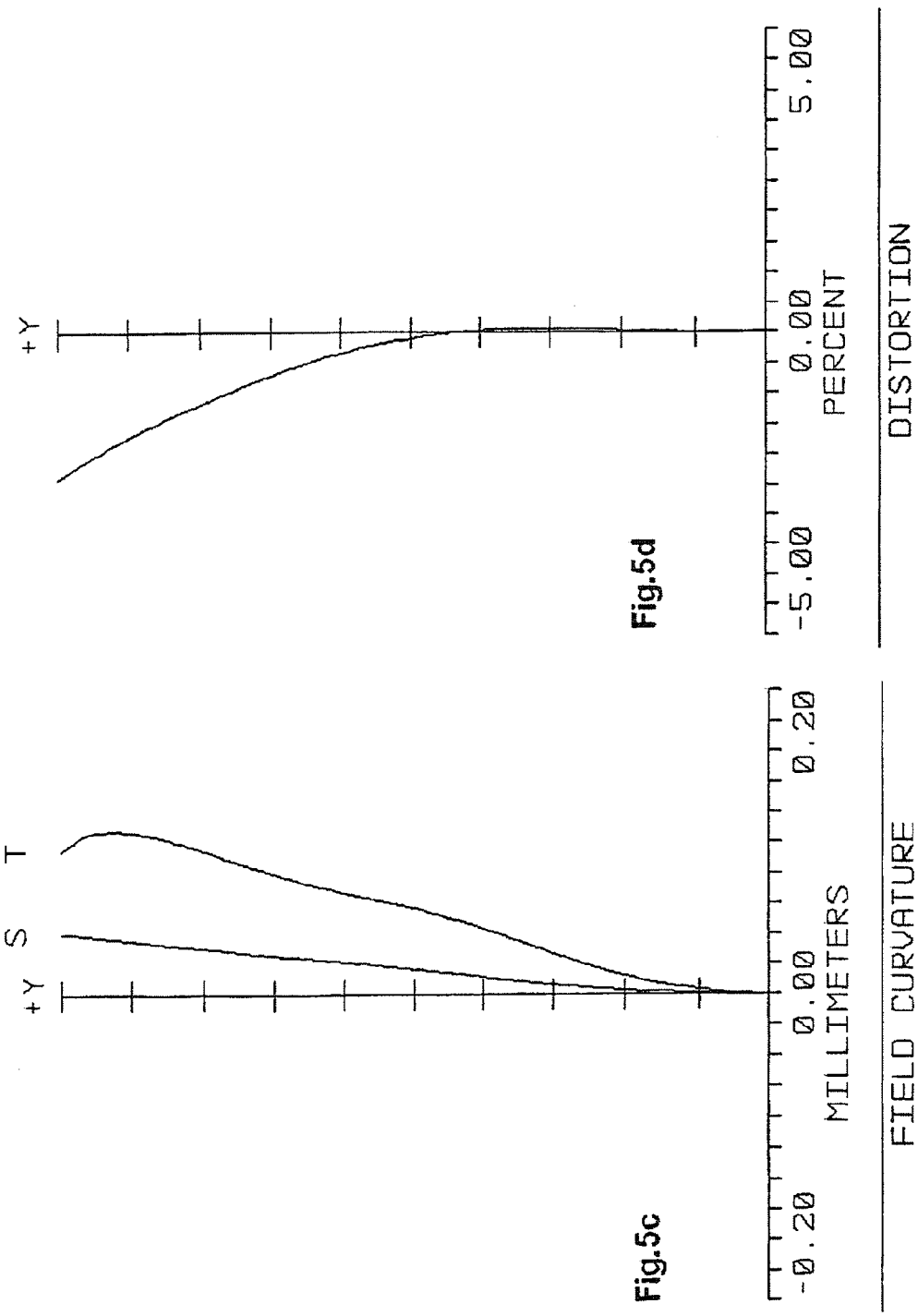

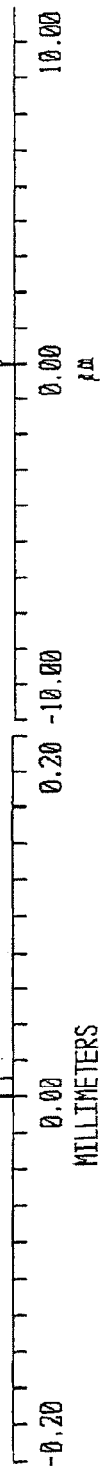
Fig.6a
Fig.6b

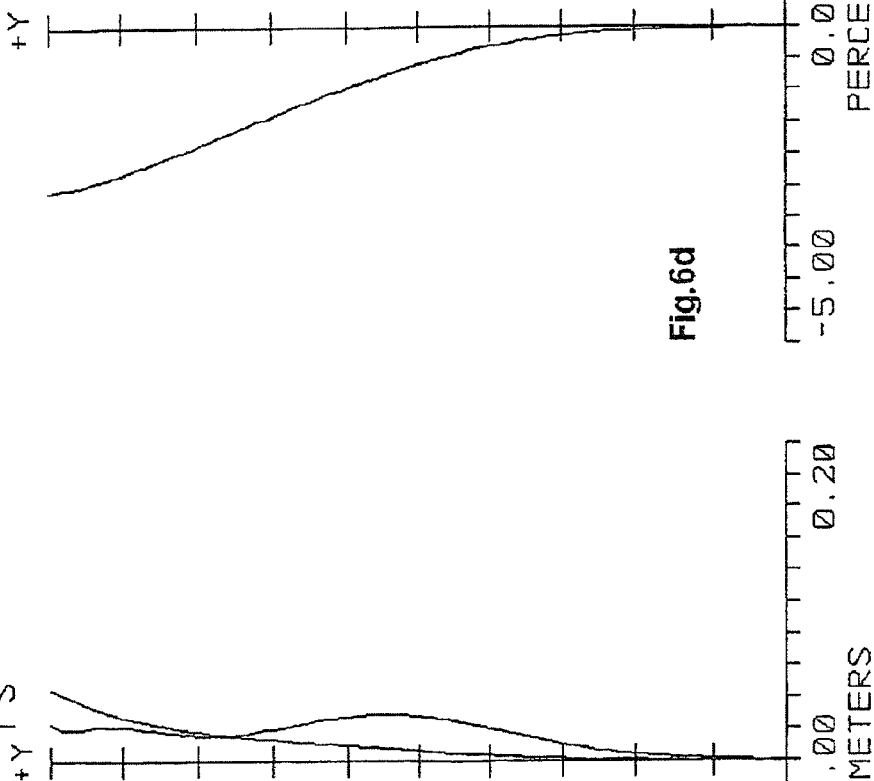

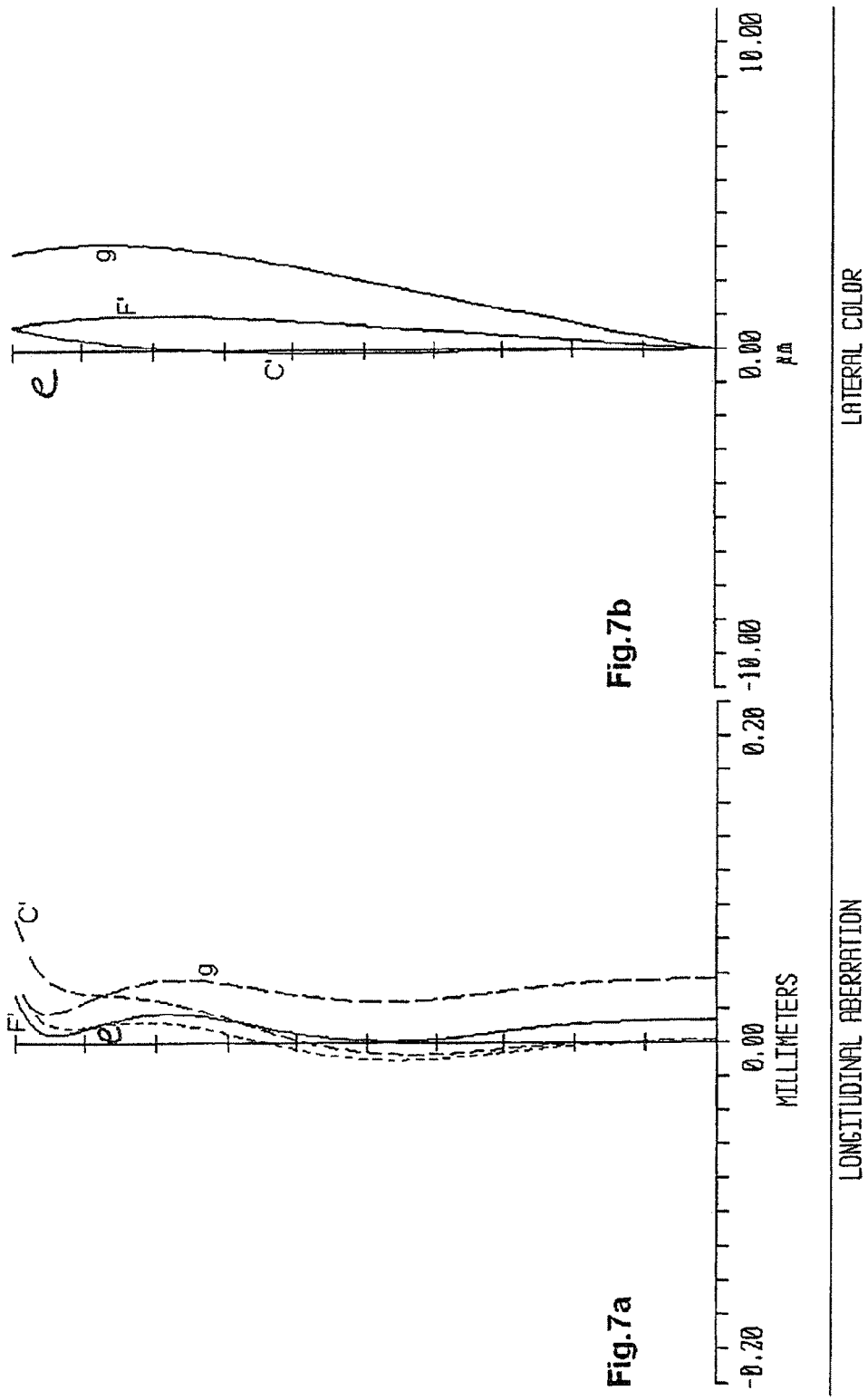

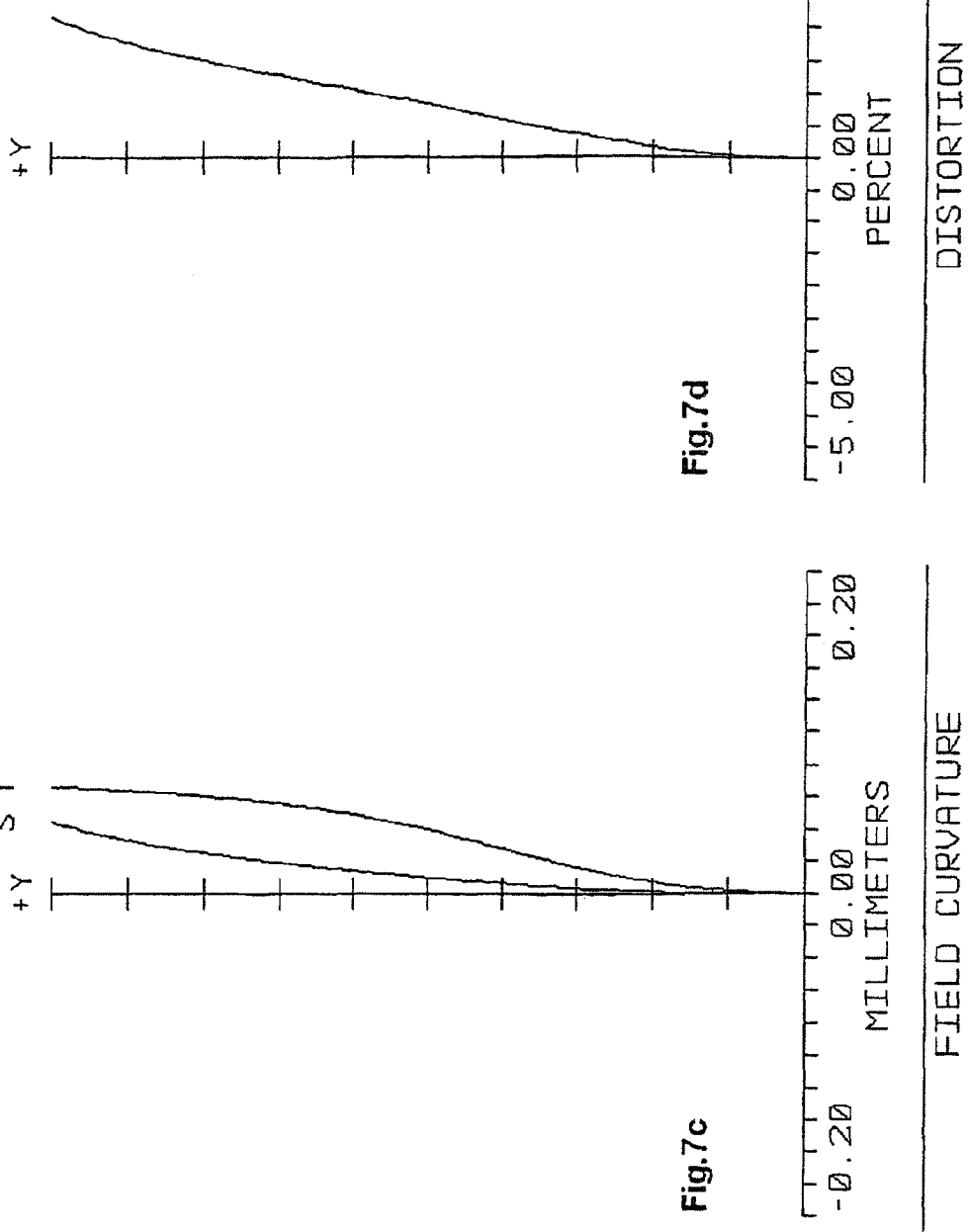

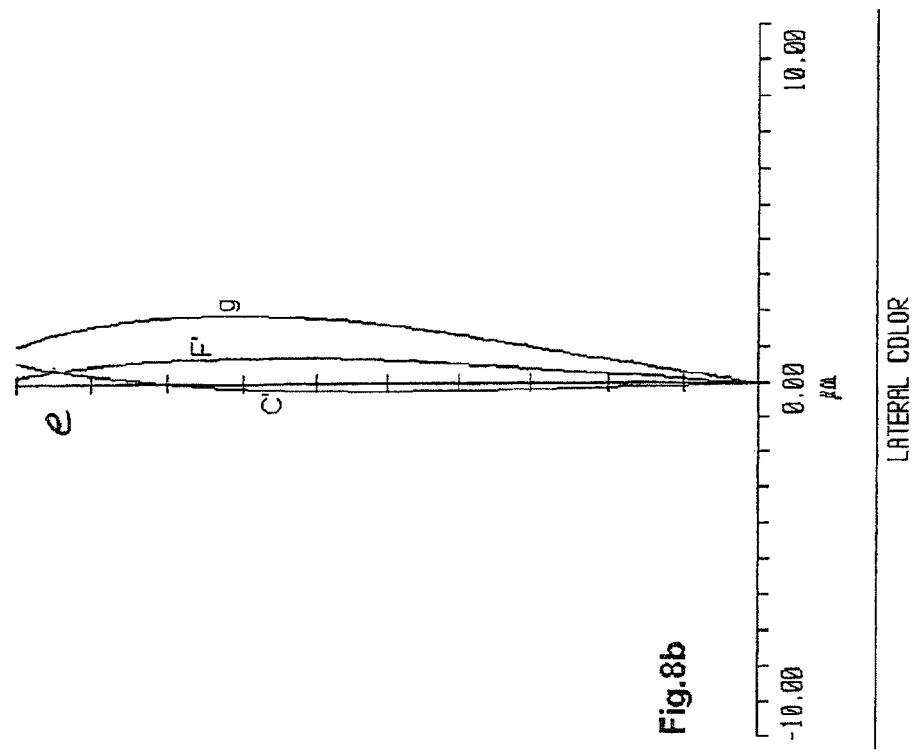
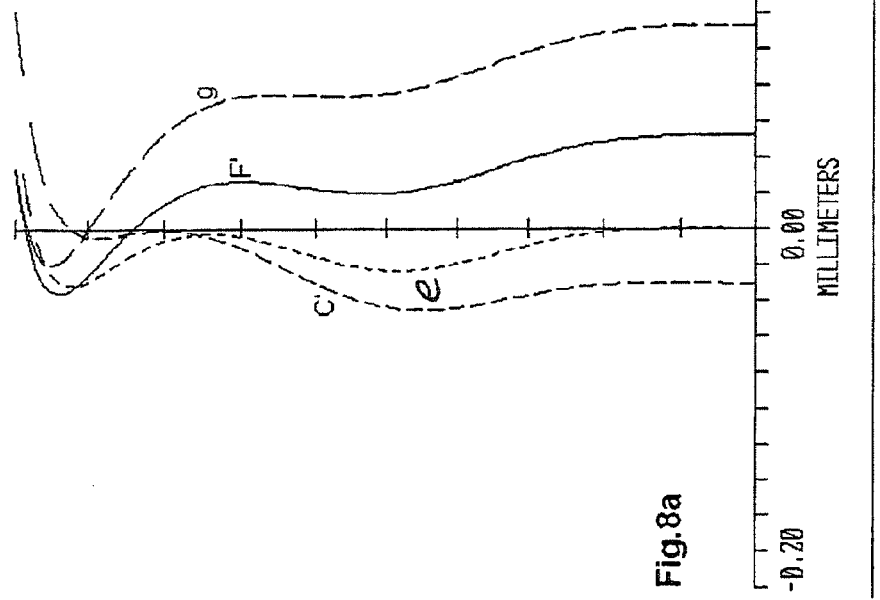

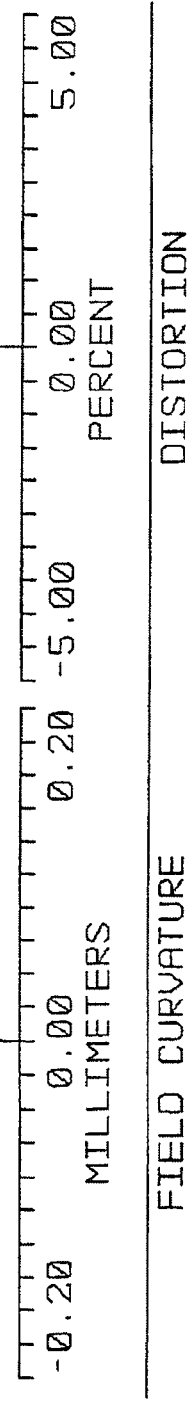

MINIATURE ZOOM LENS

CROSS-REFERENCE TO RELATED APPLICATIONS

This application is a continuation of application no. PCT/EP2009/008800, filed Dec. 9, 2009, which claims the priority of German application no. 10 2008 06 664.8, filed Dec. 12, 2008, and each of which is incorporated herein by reference.

FIELD OF THE INVENTION

The invention relates to a miniature zoom lens, likewise termed a variable objective.

BACKGROUND OF THE INVENTION

It is becoming increasingly common for mobile telephones in particular to be provided with a digital video recording device. Zoom lenses are used in order to expand the photographic capabilities. Due to the limited space available in a mobile telephone, it is necessary to design appropriate zoom lenses in greatly miniaturized form.

In a basic configuration, such miniature zoom lenses are composed of an optical lens group having negative refractive power and an optical lens group having positive refractive power. In their simplest embodiment, a front lens group having negative refractive power and a lens group, situated behind same in the direction of light incidence, having positive refractive power are used. In order to generate an actual image in the image plane, the zoom lens formed in this manner must have an overall positive refractive power.

The primary function of a zoom lens is to change its overall refractive power, which according to the known principles of paraxial imaging allows a large object section, and therefore a large total object angle, to be detected at high refractive power, and allows a small object section, and therefore a small total object angle, to be detected at low refractive power. The focal length of a lens is equal to the reciprocal of its refractive power. A change in the system focal length represents the primary function of a zoom lens, and according to the known principles of paraxial imaging allows a large object section, i.e., a large total object angle 2w, at a short focal length (WA position), and allows a small value 2w at a long system focal length (telephoto position).

In a two-group optical system, when the first lens group (front lens group) has a negative focal length $f'_1$ and the second lens group (rear lens group) has a positive focal length $f'_2$, a change in the distance between the two lens groups results in a change in the overall focal length $f'$ of the system. If the imaging plane is to be kept unchanged at the location, the zoom action must be correspondingly distributed over both lens groups. For a change in the focal length of the system from $f'$ to $f'+\Delta f'$, the second lens group (variator) must be displaced from its starting position by an increment $\Delta_2 = (f'_2/f'_1)*\Delta f'$, and the first lens group (compensator) must be correspondingly displaced as follows:

$$\Delta_1 = (f'_2/f'_1)*\Delta f'*[1-(f'^2_1/f'(f'+\Delta f'))],$$

where $f'_1$, $f'_2$ are the focal lengths of the first and the second lens group, respectively.

The discussion of both conditional equations for $\Delta_1$ and $\Delta_2$ shows that for a change in the system focal length $f'$ by $\Delta f'$, the displacement of the rear lens group (second lens group) is linear, and the displacement of the front lens group (first lens group) is nonlinear.

Corresponding zoom lenses are used not only in mobile telephones, but also in minicomputers, for example, in particular, in so-called personal digital assistants (PDAs). Such a zoom lens is known from EP 1 901 104 A1, for example.

Significant space limitations exist in particular when such a zoom lens is used in a mobile telephone. For this reason, a so-called periscope design is usually preferred, in which the part of the zoom lens which is moved during a zoom action is installed offset by 90° with respect to the front lens group. The beam path is deflected using a 90° prism (deflecting prism). A corresponding system is known from U.S. Pat. No. 7,312,931, for example.

Due to the limited installation space, corresponding miniature zoom lenses generally have a relatively low zoom factor, which is calculated from the ratio of the longest to the shortest focal length. To allow a low-aberration image to be obtained at the same time, the optical strain of the system must not exceed a specified value in any zoom position, i.e., at any of the available focal lengths. A first feature of the strain of the optical system may be the focal length of the individual lens groups. If this focal length is not too small, the geometric shape of the design elements, in particular lenses, in the optical lens group used may be satisfactorily adapted to the overall correction target of the zoom lens. However, in order to achieve a specified zoom factor, longer focal lengths require a regulating path which does not drop below a minimum value. If the adjustment space in the direction of the optical axis is too small, the refractive powers of the optical lens groups must be particularly large, resulting in considerable difficulties in the optical correction of the individual lens groups. One remedy is to form the individual optical lens groups from a fairly large number of components. However, installation space for this purpose is frequently lacking.

Due to the limited installation space, corresponding miniature zoom lenses may therefore be based only on relatively simple optical approaches, in particular a small number of lenses which have numerous aspherical surfaces for achieving the necessary imaging characteristics of the lens. US 2004/0257671 discloses a miniature zoom lens having a zoom factor of approximately 2.

In a transition to higher zoom factors >2, it has been shown that a three-group zoom structure is advantageous in which three optical lens groups are used to achieve a change in the focal length. In addition to stationary optical lens groups, such zoom lenses have a variator and two compensators, the function of the variator being to change the focal length, while the function of the compensator or compensators is to keep the location of the image generation constant as the focal length changes. Corresponding zoom lenses are known from US 2005/0105192, U.S. Pat. No. 7,315,422, U.S. Pat. No. 6,924,939, and US 2008/0062531, for example.

OBJECTS AND SUMMARY OF THE INVENTION

The object of the invention is to provide a miniature zoom lens which, with a relatively simple optical design, allows a relatively large zoom factor with high imaging power and simple zoom operation and focusing kinematics.

This object is achieved by the invention which includes:
Miniature zoom lens, comprising:
a) the zoom lens, as viewed from the object plane, includes at least the following in the stated sequence:
i) one negative first optical lens group;
ii) one negative second optical lens group;
iii) one positive third optical lens group; and
iv) one positive fourth optical lens group; and b) the second, third, and fourth optical lens groups being configured in such a way that focusing is achieved solely by displacement of the fourth optical lens group, and during the focusing the positions of the second and third lens groups remain unchanged.

The invention provides that the second, third, and fourth optical lens groups are configured in such a way that focusing is achieved solely by displacement of the fourth optical lens group, and during the focusing the positions of the second and third lens groups remain unchanged.

According to the invention, the change in focal length is achieved by displacement of the second and third optical lens groups, while the focusing is achieved solely by displacement of the fourth optical lens group. The fourth optical lens group thus remains stationary when the focal length changes.

In this manner a relatively simple optical design having a relatively small installation space is provided, which at the same time allows a relatively large zoom factor, high imaging power, and relatively simple zoom operation and focusing kinematics.

The design of the second, third, and fourth optical lens groups is selected, using known methods and tools for optics calculation, so that the zoom lens meets predefined requirements for imaging quality.

A further embodiment of the invention provides that the zoom factor is >2.0, in particular 2.5 to 2.8, in particular 2.52.

Another advantageous further embodiment of the invention provides that the ratio of the partial overall length of the lens and of the image diagonals (definition overall length) is ≤3.5, in particular approximately 3.3. The "partial overall length of the lens" is understood to mean the distance of an exit surface of a 90° prism (deflecting prism) of the lens from the imaging plane.

Another advantageous further embodiment of the invention provides that the first optical lens group, the second optical lens group, the third optical lens group, and the fourth optical lens group are designed as stated in Table A of the description below.

A system for digital video recording in accordance with the invention includes a digital video recording device, which has:
a) a digital image recorder; and
b) a miniature zoom lens, and the zoom lens, as viewed from the object plane, has at least the following in the stated sequence:
  i) one negative first optical lens group;
  ii) one negative second optical lens group;
  iii) one positive third optical lens group; and
  iv) one positive fourth optical lens group; and
c) the second, third, and fourth optical lens groups being configured in such a way that focusing is achieved solely by displacement of the fourth optical lens group, and during the focusing the positions of the second and third lens groups remain unchanged.

A mobile telephone having a system for digital video recording according to the invention includes:
a) a digital image recorder; and
b) a miniature zoom lens, and the zoom lens, as viewed from the object plane, has at least the following in the stated sequence:
  i) one negative first optical lens group;
  ii) one negative second optical lens group;
  iii) one positive third optical lens group; and
  iv) one positive fourth optical lens group; and
c) the second, third, and fourth optical lens groups being configured in such a way that focusing is achieved solely by displacement of the fourth optical lens group, and during the focusing the positions of the second and third lens groups remain unchanged.

The invention is explained in greater detail below with reference to the accompanying drawings, in which one embodiment of a zoom lens according to the invention is illustrated. All features described, illustrated in the drawings, and claimed in the patent claims constitute the subject matter of the invention, alone or in any given combination, independently of their combination in the patent claims or dependencies, and independently of their description or illustration in the drawings. Ranges provided in the description encompass the respective stated overall range as well as all subranges contained therein.

BRIEF DESCRIPTION OF THE DRAWINGS

FIGS. 2a-2f show the same illustration as FIG. 1, but in reduced scale, of the zoom lens according to FIG. 1 in various configurations (zoom positions and range settings), FIGS. 3a-3d show graphics of the geometric aberrations for the configuration according to FIG. 2a, FIGS. 4a-4d show graphics of the geometric aberrations for the configuration according to FIG. 2b, FIGS. 5a-5d show graphics of the geometric aberrations for the configuration according to FIG. 2c, FIGS. 6a-6d show graphics of the geometric aberrations for the configuration according to FIG. 2d, FIGS. 7a-7d show graphics of the geometric aberrations for the configuration according to FIG. 2e, and FIGS. 8a-8d show graphics of the geometric aberrations for the configuration according to FIG. 2f.

DETAILED DESCRIPTION OF THE INVENTION

Figure 1:
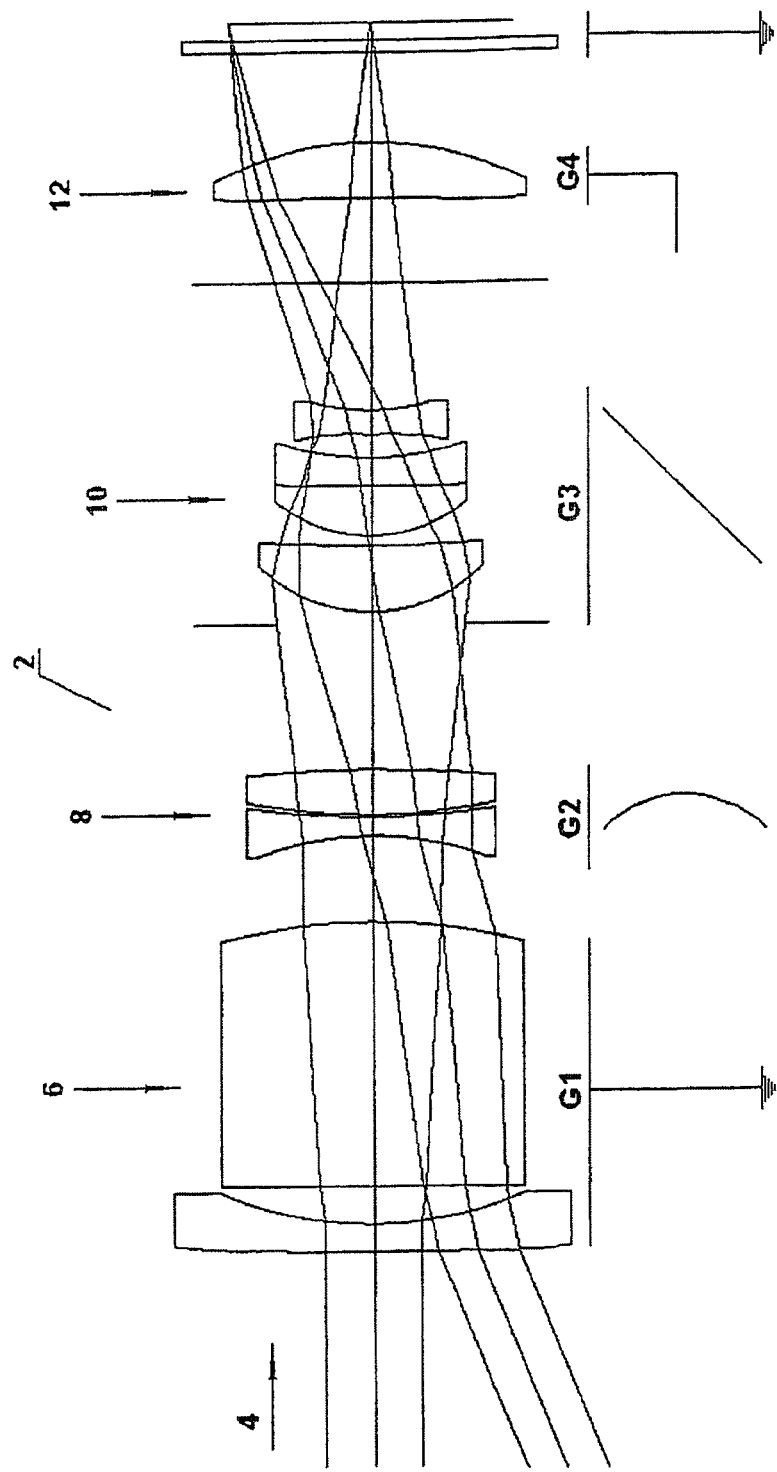
FIG. 1 shows a sectional view of one embodiment of a zoom lens according to the invention.

FIG. 1 illustrates one embodiment of a miniature zoom lens or variable objective 2 according to the invention, which in the present embodiment is provided for installation in a mobile telephone, omitted for clarity. Viewed from an object plane, i.e., in a direction of light incidence denoted by an arrow 4 in FIG. 1, the zoom lens—also referred to below as "lens" for short—has a first optical lens group 6 and a second optical lens group 8, each having a negative refractive power. In addition, the lens 2 has a third optical lens group 10 and a fourth optical lens group 12. According to the invention, the second, third, and fourth optical lens groups 8, 10, 12 are configured in such a way that focusing occurs solely by displacement of the fourth optical lens group 12, and the positions of the second and third optical lens groups 8, 10 remain unchanged during the focusing. According to the invention, a change in the focal length of the lens 2 is achieved solely by displacement of the second and third optical lens groups 8, 10, the third optical lens group 10 forming a variator and being linearly displaced when the focal length changes, and the second optical lens group 8 forming a compensator and being nonlinearly displaced when the focal length changes. Thus, according to the invention the fourth optical lens group 12 has no zoom function, and is used exclusively for focusing.

FIGS. 2a through 2f show the lens 2 in various configurations (config. 1 through 6; see Table A), namely, for three different focal lengths and two range settings. The figures are associated with the configurations as follows:

FIG. 2a: Wide-angle position (WA), 2w=64.60°, focal length f'e=5.166 mm, EE=infinity (configuration or config. 1, respectively), FIG. 2b: Middle position (Mid), 2w=44.00°, focal length f'e=7.724 mm, EE=infinity (configuration or config. 2, respectively), FIG. 2c: Telephoto position (Tele), 2w=28.00°, focal length f'e=13.05 mm, EE=infinity (configuration or config. 3, respectively), FIG. 2d: Wide-angle position (WA), 2w=64.72°, focal length f'e=5.118 mm, EE=500 mm (configuration or config. 4, respectively), FIG. 2e: Middle position (Mid), 2w=44.37°, focal length f'e=7.573 mm, EE=500 mm (configuration or config. 5, respectively), and FIG. 2f: Telephoto position (Tele), 2w=28.96°, focal length f'e=12.42 mm, EE=500 mm (configuration or config. 6, respectively).

The information concerning the focal length is provided for the green spectral line "e" of wavelength=546.0740 nm. This is also the main wavelength in the system.

The object-side field angle 2w for the middle position is calculated as follows:

$$\tan w_{Mid} = sqrt(\tan w_{WA} * \tan w_{Tele})$$

A comparison of the various zoom positions and focus settings illustrated in FIGS. 2a through 2f shows that the fourth optical lens group 12 has no zoom function.

As the focal length is adjusted, the f-stop number changes from 2.8 in the wide-angle position, to 3.6 in the middle position, to 5.0 in the telephoto position.

With regard to FIGS. 1 and 2, it is noted that the first optical lens group 6 has a deflecting prism 14 by means of which the beam path is deflected by 90°. However, for purposes of illustration the beam path is not shown in the deflected state in FIGS. 1 and 2.

Table A of the present description sets forth the configuration of optical lens groups 6, 8, 10, and 12 used in the present embodiment, the optical surfaces being numbered consecutively in order of their sequence in the direction of light incidence 4. Surface "OBJ" stands for the lens plane, while surface "STO" stands for the actual physical aperture stop of the lens 2. "IMA" stands for the last surface in the optical system, namely, the imaging plane. In Table A, the optical surfaces are specified in greater detail with respect to their material and geometry under "SURFACE DATA SUMMARY." The "Type" column indicates whether the surface is spherical or aspherical. The "Radius" and "Thickness" columns indicate, respectively, the radius of curvature and the thickness of the particular optical element in the direction of light propagation. The "Glass" column indicates the media refractive index n(d) and the Abbe number v(d) of the optical element or of the space behind the surface. Surface No. 17 is a reference surface which has no physical effect, and which virtually divides the air space between the variator group 10 and the focusing group 12.

In standard air, the Fraunhofer spectral line "d" has a wavelength of
d=587.5618 nm.

The resulting Abbe number v(d) is:

$$v(d)=[n(d)-1]/[n(F)-n(C)],$$

where the wavelengths of the blue and red Fraunhofer lines are as follows:
"F"=486.1327 nm and
"C"=656.2725 nm.

The "Diameter" column indicates the diameter of the particular optical element, and the "Conic" column indicates the conicity of the particular optical element. The "SURFACE DATA DETAIL" section defines the aspherical optical surfaces in greater detail with respect to their coefficients, which typically result from polynomial expansion of the deviation from a spherical surface.

The aspherical surface is described as follows:

$$z = \frac{c \cdot r^2}{1 + \sqrt{1-(1+k) \cdot c^2 \cdot r^2}} + \alpha_1 \cdot r^2 + \alpha_2 \cdot r^4 + \alpha_3 \cdot r^6 + \alpha_4 \cdot r^8 + \alpha_5 \cdot r^{10} + \alpha_6 \cdot r^{12} + \alpha_7 \cdot r^{14} + \alpha_8 \cdot r^{16}$$

where
z=rising height,
c=paraxial surface curvature, c=1/R, where R is the vertex radius of the surface,
r=radial surface height,
k=conical constant, and
$\alpha_1, \alpha_2, \ldots, \alpha_n$=aspherical coefficients of the polynomial.

A corresponding polynomial expansion is also found in U.S. Pat. No. 6,924,939 B2 and US 2005/0105192 A1.

In order to focus from ∞ to nearby objects, the fourth optical lens group 12 is displaced in the direction opposite arrow 4.

For a positive focal length of the focusing lens group 12, during the setting (focusing) on nearby objects the group 12 must be correspondingly displaced away from the imaging plane. It is known that the regulating path is a function of the focusing distance EE, the instantaneous focal length of the lens (zoom position), and the focal length of the group 12. The focusing action of the group 12 is illustrated below in table form by way of example for EE=infinity and EE=500 mm, and for three zoom positions (WA, Mid, Tele):

|  | Thickness [17] | | Thickness [19] | |
| --- | --- | --- | --- | --- |
|  | EE = infinity | EE = 500 | EE = infinity | EE = 500 |
| WA | 2.022840 | 1.856223 | 2.046667 | 2.213284 |
| Mid | 2.022840 | 1.665228 | 2.046667 | 2.404279 |
| Tele | 2.022840 | 1.114570 | 2.046667 | 2.954937 |

In the illustrated embodiment, a zoom factor of 2.52 and a definition overall length of 3.3 are obtained.

Figure 4D:
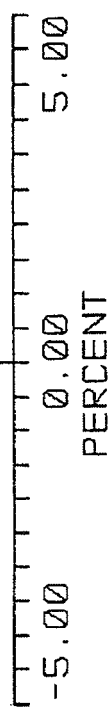
Figure 4C:
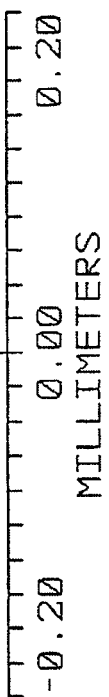

FIG. 3 (FIGS. 3a-3d) through 8 (FIGS. 8a-8d) illustrate selected aberrations, and elucidate the correction state of the lens in six configurations (zoom positions) of the lens, denoted by config. 1 through config. 6. The figures are associated with the configurations (config.) as follows:

FIG. 3: Config. 1, wide-angle position (WA), 2w=64.60°, focal length f'e=5.166 mm, EE=infinity, FIG. 4: Config. 2, middle position (Mid), 2w=44.00°, focal length f'e=7.724 mm, EE=infinity, FIG. 5: Config. 3, telephoto position (Tele), 2w=28.00°, focal length f'e=13.05 mm, EE=infinity, FIG. 6: Config. 4, wide-angle position (WA'), 2w=44.37°, focal length f'e=5.118 mm, EE=500 mm, FIG. 7: Config. 5, middle position (Mid'), 2w=64.72°, focal length f'e=7.573 mm, EE=500 mm, and FIG. 8: Config. 6, telephoto position (Tele'), 2w=28.96°, focal length f'e=12.42 mm, EE=500 mm.

FIGS. 3a, 4a, 5a, 6a, 7a, and 8a show the spherochromatism of the axis point imaging for four wavelengths of the Fraunhofer spectral lines C', e, F', and g (longitudinal aberration). The ordinate axis represents the height in the entrance pupil of the system, and the abscissa indicates the differences in focal length relative to the location of the imaging plane (smallest interval=20 μm). The green mercury line e=546.0740 nm is the main wavelength. The cadmium lines F'=479.9914 nm and C'=643.8469 nm form the achromatic wavelength pair (corresponding to the colors blue and red). The mercury line g=435.8343 nm indicates the chromatic characteristic of the system in the violet portion of the spectrum.

FIGS. 3b, 4b, 5b, 6b, 7b and 8b show the actual color magnification error (lateral color); for the principal rays of wavelengths C', F', and g, the transversal penetration coordinate deviation in μm is indicated for the principal ray of the main wavelength "e" for all image heights in the imaging plane. The maximum image height y'=3.175 [mm] in the imaging plane corresponds to the maximum value of the object-side field angle w [°] shown on the ordinate axis.

FIGS. 3c, 4c, 5c, 6c, 7c, and 8c show the astigmatism and field curvature. For the primary color "e," the curves of the meridional (T) and the sagittal (S) image layers are illustrated as a function of the image height. The distance from the imaging plane may be read on the abscissa (smallest interval=20 μm). The maximum image height y'=3.175 [mm] in the imaging plane corresponds to the maximum value of the object-side field angle w [°] shown on the ordinate axis.

FIGS. 3d, 4d, 5d, 6d, 7d, and 8d show the distortion, i.e., the orthoscopy, of the imaging. For the main wavelength "e" the actual penetration coordinate y' [mm] of the principal ray is calculated in the imaging plane for all object-side field angles w [°]. The ideal image height $y_i'$ [mm] is known for each of these points, based on the relationship $y_i'=f*\tan(w)$.

The distortion is then expressed as the relative percent image height error:

$$V\% = [(y' - y_i')/y_i']*100$$

The invention thus provides, in a relatively simple and compact design, a zoom lens having a relatively large zoom factor and excellent imaging characteristics, and which provides simplified zoom operation and focusing kinematics.

TABLE A

SURFACE DATA SUMMARY:

| Surf | Type | Radius | Thickness | Glass | Diameter | Conic |
|---|---|---|---|---|---|---|
| OBJ | STANDARD | Infinity | Infinity | | 0 | 0 |
| 1 | EVENASPH | Infinity | 0.65 | 1.90366, 31.32 | 9 | 0 |
| 2 | EVENASPH | 8.5055 | 0.903 | | 6.8 | 3.692425 |
| 3 | STANDARD | Infinity | 6.2 | 1.88300, 40.76 | 6.8 | 0 |
| 4 | STANDARD | −12.835 | 0.3701198 | | 5.6 | 0 |
| 5 | STANDARD | −7.116 | 0.45 | 1.81600, 46.62 | 5.3 | 0 |
| 6 | STANDARD | 19.329 | 0.046 | | 5.6 | 0 |
| 7 | STANDARD | 13.658 | 1.05 | 1.80518, 25.42 | 5.6 | 0 |
| 8 | STANDARD | −27.119 | 7.318156 | | 4.6 | 0 |
| STO | STANDARD | Infinity | 0.3 | | 4.24 | 0 |
| 10 | EVENASPH | 3.44369 | 1.55 | 1.52690, 66.22 | 5 | −0.7337664 |
| 11 | STANDARD | 44.757 | 0.222821 | | 5 | 0 |
| 12 | STANDARD | 3.2178 | 1.175 | 1.48656, 84.47 | 4.3 | 0 |
| 13 | STANDARD | 80.94 | 0.657 | 1.84666, 23.82 | 4.3 | 0 |
| 14 | STANDARD | 6.1278 | 0.55587 | | 4.085 | 0 |
| 15 | EVENASPH | 39.7318 | 0.573 | 1.80610, 40.90 | 3.45 | −3167.582 |
| 16 | EVENASPH | 4.037 | 0.7398879 | | 2.6 | 0.08559944 |
| 17 | STANDARD | Infinity | 2.02284 | | 7 | 0 |
| 18 | EVENASPH | −41.11929 | 1.3 | 1.48656, 84.47 | 6.3 | −874.7292 |
| 19 | EVENASPH | −6.25961 | 2.046667 | | 6.6 | −0.06663516 |
| 20 | STANDARD | Infinity | 0.3 | 1.51680, 64.17 | 8.5 | 0 |
| 21 | STANDARD | Infinity | 0.4 | | 8.5 | 0 |
| IMA | STANDARD | Infinity | | | 6.35 | 0 |

SURFACE DATA DETAIL:

| | |
|---|---|
| Surface OBJ: | STANDARD |
| Surface 1: | EVENASPH |
| Coeff on r 2: | 0 |
| Coeff on r 4: | 0.00026016718 |
| Coeff on r 6: | 6.2030297e−006 |
| Coeff on r 8: | 0 |
| Coeff on r 10: | 0 |
| Coeff on r 12: | 0 |
| Coeff on r 14: | 0 |
| Coeff on r 16: | 0 |
| Surface 2: | EVENASPH |
| Coeff on r 2: | 0 |
| Coeff on r 4: | −0.00075445829 |
| Coeff on r 6: | 5.6770345e−006 |
| Coeff on r 8: | −5.6465513e−006 |
| Coeff on r 10: | 2.7660691e−007 |
| Coeff on r 12: | −1.5174551e−009 |
| Coeff on r 14: | −1.1567391e−009 |
| Coeff on r 16: | 2.6811704e−012 |
| Surface STO: | STANDARD |
| Surface 10: | EVENASPH |
| Coeff on r 2: | 0 |
| Coeff on r 4: | 0.0023473359 |
| Coeff on r 6: | 3.1961048e−005 |
| Coeff on r 8: | 2.6003368e−005 |

TABLE A-continued

| | |
|---|---|
| Coeff on r 10: | 3.8415376e−007 |
| Coeff on r 12: | −1.0604597e−006 |
| Coeff on r 14: | 2.2460846e−007 |
| Coeff on r 16: | −1.5067003e−008 |
| Surface 15: | EVENASPH |
| Coeff on r 2: | 0 |
| Coeff on r 4: | −0.023935444 |
| Coeff on r 6: | −0.00011096119 |
| Coeff on r 8: | −0.00089515281 |
| Coeff on r 10: | 0.0010576517 |
| Coeff on r 12: | 0.00013164034 |
| Coeff on r 14: | −0.00039348326 |
| Coeff on r 16: | 0.00010053502 |
| Surface 16: | EVENASPH |
| Coeff on r 2: | 0 |
| Coeff on r 4: | −0.016631633 |
| Coeff on r 6: | 0.0056208456 |
| Coeff on r 8: | −0.0023327203 |
| Coeff on r 10: | 0.0012199545 |
| Coeff on r 12: | 0.00016507654 |
| Coeff on r 14: | −0.00033653855 |
| Coeff on r 16: | 7.1280871e−005 |
| Surface 18: | EVENASPH |
| Coeff on r 2: | 0 |
| Coeff on r 4: | 0.00045397985 |
| Coeff on r 6: | 0 |
| Coeff on r 8: | 0 |
| Coeff on r 10: | 0 |
| Coeff on r 12: | 0 |
| Coeff on r 14: | 0 |
| Coeff on r 16: | 0 |
| Surface 19: | EVENASPH |
| Coeff on r 2: | 0 |
| Coeff on r 4: | 0.0026934903 |
| Coeff on r 6: | −0.00037810703 |
| Coeff on r 8: | 3.6873611e−005 |
| Coeff on r 10: | −1.3983017e−006 |
| Coeff on r 12: | −7.2744629e−008 |
| Coeff on r 14: | 9.3446719e−009 |
| Coeff on r 16: | −2.7514603e−010 |
| Surface IMA: | STANDARD |

MULTI-CONFIGURATION DATA (Configurations 1 to 6 in accordance with FIG. 2):

| | |
|---|---|
| Configuration 1: | "WA" |
| Thickness 0: | 1e+010 |
| Thickness 4: | 0.3701198 |
| Thickness 8: | 7.318156 |
| Thickness 16: | 0.7398879 |
| Thickness 17: | 2.02284 |
| Thickness 19: | 2.046667 |
| Configuration 2: | "Mid" |
| Thickness 0: | 1e+010 |
| Thickness 4: | 1.987374 |
| Thickness 8: | 3.465745 |
| Thickness 16: | 2.975045 |
| Thickness 17: | 2.02284 |
| Thickness 19: | 2.046667 |
| Configuration 3: | "Tele" |
| Thickness 0: | 1e+010 |
| Thickness 4: | 0.5391191 |
| Thickness 8: | 0.4 |
| Thickness 16: | 7.489045 |
| Thickness 17: | 2.02284 |
| Thickness 19: | 2.046667 |
| Configuration 4: | "WA" |
| Thickness 0: | 500 |
| Thickness 4: | 0.3701198 |
| Thickness 8: | 7.318156 |
| Thickness 16: | 0.7398879 |
| Thickness 17: | 1.856223 |
| Thickness 19: | 2.213284 |
| Configuration 5: | "Mid" |
| Thickness 0: | 500 |
| Thickness 4: | 1.987374 |
| Thickness 8: | 3.465745 |
| Thickness 16: | 2.975045 |
| Thickness 17: | 1.665228 |
| Thickness 19: | 2.404279 |

TABLE A-continued

| Configuration 6: | "Tele"" |
|---|---|
| Thickness 0: | 500 |
| Thickness 4: | 0.5391191 |
| Thickness 8: | 0.4 |
| Thickness 16: | 7.489045 |
| Thickness 17: | 1.11457 |
| Thickness 19: | 2.954937 |

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Miniature zoom lens, comprising:
   a) the zoom lens, as viewed from the object plane, includes at least the following in the stated sequence:
      i) one negative first optical lens group;
      ii) one negative second optical lens group;
      iii) one positive third optical lens group; and
      iv) one positive fourth optical lens group;
   b) the first optical lens group being a stationary lens group;
   c) the second, third, and fourth optical lens groups being configured in such a way that focusing is achieved solely by displacement of the fourth optical lens group, and during the focusing the positions of the second and third lens groups remain unchanged;
   d) the second, third and fourth optical lens groups being configured in such a way that a change in focal length is achieved solely by displacement of the second and third optical lens groups and during the change of the focal length the position of the fourth optical lens group remains unchanged;
   e) the lens has a zoom factor which is >2.0; and
   f) a ratio of the partial overall length of the lens and of the image diagonals is ≤3.5.

2. Zoom lens according to claim 1, wherein:
   a) the ratio of the partial overall length of the lens and of the image diagonals is approximately 3.3.

3. Zoom lens according to claim 1, wherein:
   a) the zoom factor is ≥2.5 and ≤2.8.

4. Zoom lens according to claim 1, wherein:
   a) the zoom factor is 2.52.

5. Miniature zoom lens, comprising:
   a) the zoom lens, as viewed from the object plane, includes at least the following in the stated sequence:
      i) one negative first optical lens group;
      ii) one negative second optical lens group;
      iii) one positive third optical lens group; and
      iv) one positive fourth optical lens group;
   b) the first optical lens group being a stationary lens group;
   c) the second, third, and fourth optical lens groups being configured in such a way that focusing is achieved solely by displacement of the fourth optical lens group, and during the focusing the positions of the second and third lens groups remain unchanged;
   d) the second, third and fourth optical lens groups being configured in such a way that a change in focal length is achieved solely by displacement of the second and third optical lens groups and during the change of the focal length the position of the fourth optical lens group remains unchanged; and
   e) the first optical lens group, the second optical lens group, the third optical lens group, and the fourth optical lens group are configured as set forth in accordance with the following

| SURFACE DATA SUMMARY: | | | | | | |
|---|---|---|---|---|---|---|
| Surf | Type | Radius | Thickness | Glass | Diameter | Conic |
| OBJ | STANDARD | Infinity | Infinity | | 0 | 0 |
| 1 | EVENASPH | Infinity | 0.65 | 1.90366, 31.32 | 9 | 0 |
| 2 | EVENASPH | 8.5055 | 0.903 | | 6.8 | 3.692425 |
| 3 | STANDARD | Infinity | 6.2 | 1.88300, 40.76 | 6.8 | 0 |
| 4 | STANDARD | −12.835 | 0.3701198 | | 5.6 | 0 |
| 5 | STANDARD | −7.116 | 0.45 | 1.81600, 46.62 | 5.3 | 0 |
| 6 | STANDARD | 19.329 | 0.046 | | 5.6 | 0 |
| 7 | STANDARD | 13.658 | 1.05 | 1.80518, 25.42 | 5.6 | 0 |
| 8 | STANDARD | −27.119 | 7.318156 | | 4.6 | 0 |
| STO | STANDARD | Infinity | 0.3 | | 4.24 | 0 |
| 10 | EVENASPH | 3.44369 | 1.55 | 1.52690, 66.22 | 5 | −0.7337664 |
| 11 | STANDARD | 44.757 | 0.222821 | | 5 | 0 |
| 12 | STANDARD | 3.2178 | 1.175 | 1.48656, 84.47 | 4.3 | 0 |
| 13 | STANDARD | 80.94 | 0.657 | 1.84666, 23.82 | 4.3 | 0 |
| 14 | STANDARD | 6.1278 | 0.55587 | | 4.085 | 0 |
| 15 | EVENASPH | 39.7318 | 0.573 | 1.80610, 40.90 | 3.45 | −3167.582 |
| 16 | EVENASPH | 4.037 | 0.7398879 | | 2.6 | 0.08559944 |
| 17 | STANDARD | Infinity | 2.02284 | | 7 | 0 |
| 18 | EVENASPH | −41.11929 | 1.3 | 1.48656, 84.47 | 6.3 | −874.7292 |
| 19 | EVENASPH | −6.25961 | 2.046667 | | 6.6 | −0.06663516 |
| 20 | STANDARD | Infinity | 0.3 | 1.51680, 64.17 | 8.5 | 0 |
| 21 | STANDARD | Infinity | 0.4 | | 8.5 | 0 |
| IMA | STANDARD | Infinity | | | 6.35 | 0. |

6. Miniature zoom lens, comprising:
a) the zoom lens, as viewed from the object plane, includes at least the following in the stated sequence:
   i) one negative first optical lens group;
   ii) one negative second optical lens group;
   iii) one positive third optical lens group; and
   iv) one positive fourth optical lens group;
b) the first optical lens group being a stationary lens group;
c) the second, third, and fourth optical lens groups being configured in such a way that focusing is achieved solely by displacement of the fourth optical lens group, and during the focusing the positions of the second and third lens groups remain unchanged;
d) the second, third and fourth optical lens groups being configured in such a way that a change in focal length is achieved solely by displacement of the second and third optical lens groups and during the change of the focal length the position of the fourth optical lens group remains unchanged; and
e) the first optical lens group, the second optical lens group, the third optical lens group, and the fourth optical lens group are configured as set forth in accordance with the following surface data detail:

| Surface OBJ | STANDARD |
|---|---|
| Surface 1 | EVENASPH |
| Coeff on r 2 | 0 |
| Coeff on r 4 | 0.00026016718 |
| Coeff on r 6 | 6.2030297e−006 |
| Coeff on r 8 | 0 |
| Coeff on r 10 | 0 |
| Coeff on r 12 | 0 |
| Coeff on r 14 | 0 |
| Coeff on r 16 | 0 |
| Surface 2 | EVENASPH |
| Coeff on r 2 | 0 |
| Coeff on r 4 | −0.00075445829 |
| Coeff on r 6 | 5.6770345e−006 |
| Coeff on r 8 | −5.6465513e−006 |
| Coeff on r 10 | 2.7660691e−007 |
| Coeff on r 12 | −1.5174551e−009 |
| Coeff on r 14 | −1.1567391e−009 |
| Coeff on r 16 | 2.6811704e−012 |
| Surface STO | STANDARD |
| Surface 10 | EVENASPH |
| Coeff on r 2 | 0 |
| Coeff on r 4 | 0.0023473359 |
| Coeff on r 6 | 3.1961048e−005 |
| Coeff on r 8 | 2.6003368e−005 |
| Coeff on r 10 | 3.8415376e−007 |
| Coeff on r 12 | −1.0604597e−006 |
| Coeff on r 14 | 2.2460846e−007 |
| Coeff on r 16 | −1.5067003e−008 |
| Surface 15 | EVENASPH |
| Coeff on r 2 | 0 |
| Coeff on r 4 | −0.023935444 |
| Coeff on r 6 | −0.00011096119 |
| Coeff on r 8 | −0.00089515281 |
| Coeff on r 10 | 0.0010576517 |
| Coeff on r 12 | 0.00013164034 |
| Coeff on r 14 | −0.00039348326 |
| Coeff on r 16 | 0.00010053502 |
| Surface 16 | EVENASPH |
| Coeff on r 2 | 0 |
| Coeff on r 4 | −0.016631633 |
| Coeff on r 6 | 0.0056208456 |
| Coeff on r 8 | −0.0023327203 |
| Coeff on r 10 | 0.0012199545 |
| Coeff on r 12 | 0.00016507654 |
| Coeff on r 14 | −0.00033653855 |
| Coeff on r 16 | 7.1280871e−005 |
| Surface 18 | EVENASPH |
| Coeff on r 2 | 0 |
| Coeff on r 4 | 0.00045397985 |
| Coeff on r 6 | 0 |
| Coeff on r 8 | 0 |
| Coeff on r 10 | 0 |
| Coeff on r 12 | 0 |
| Coeff on r 14 | 0 |
| Coeff on r 16 | 0 |
| Surface 19 | EVENASPH |
| Coeff on r 2 | 0 |
| Coeff on r 4 | 0.0026934903 |
| Coeff on r 6 | −0.00037810703 |
| Coeff on r 8 | 3.6873611e−005 |
| Coeff on r 10 | −1.3983017e−006 |
| Coeff on r 12 | −7.2744629e−008 |
| Coeff on r 14 | 9.3446719e−009 |
| Coeff on r 16 | −2.7514603e−010 |
| Surface IMA | STANDARD. |

\* \* \* \* \*